(12) United States Patent
Tang et al.

(10) Patent No.: US 8,536,742 B2
(45) Date of Patent: Sep. 17, 2013

(54) LINEAR SYNCHRONOUS MOTOR

(75) Inventors: Yuqi Tang, Nagano (JP); Satoshi Sugita, Nagano (JP)

(73) Assignee: Sanyo Denki Co. Ltd., Tokyo (JP)

( * ) Notice: Subject to any disclaimer, the term of this patent is extended or adjusted under 35 U.S.C. 154(b) by 345 days.

(21) Appl. No.: 12/975,561

(22) Filed: Dec. 22, 2010

(65) Prior Publication Data
US 2011/0156499 A1 Jun. 30, 2011

(30) Foreign Application Priority Data
Dec. 24, 2009 (JP) ................................. 2009-293449

(51) Int. Cl.
*H02K 41/03* (2006.01)
(52) U.S. Cl.
USPC .................. 310/12.15; 310/12.18; 310/12.19; 310/12.22; 310/12.25; 310/12.31
(58) Field of Classification Search
USPC 310/12.15, 12.18, 12.21–12.22, 12.24–12.26, 310/12.31
See application file for complete search history.

(56) References Cited

U.S. PATENT DOCUMENTS

| 6,329,728 B1 * | 12/2001 | Kitazawa et al. | 310/14 |
| 6,661,129 B2 * | 12/2003 | Tamura et al. | 310/12.16 |
| 7,385,317 B2 * | 6/2008 | Sugita et al. | 310/12.15 |
| 2010/0033032 A1 * | 2/2010 | Tang et al. | 310/12.18 |
| 2010/0148595 A1 * | 6/2010 | Tang et al. | 310/12.02 |

FOREIGN PATENT DOCUMENTS

| JP | 2001-286122 | 10/2001 |
| JP | 2005-328598 | 11/2005 |

* cited by examiner

*Primary Examiner* — Burton Mullins
*Assistant Examiner* — Eric Johnson
(74) *Attorney, Agent, or Firm* — Rankin, Hill & Clark LLP

(57) ABSTRACT

A stator core unit of a linear synchronous motor is divided into a plurality of divided cores. The divided cores each include a pair of connected portions. The pairs of connected portions are disposed along a first direct drive shaft and a second direct drive shaft to form a pair of connected portion arrays. A yoke is constituted from a pair of yoke elements which are formed of a magnetic conductive material and magnetically connect the connected portions of the pair of connected portion arrays. A first array of permanent magnets and a second array of permanent magnets are disposed to be shifted from each other by an electrical angle of 180°. A first array of windings and a second array of windings are excited with the first and second arrays of windings being shifted by an electrical angle of 180°.

8 Claims, 18 Drawing Sheets

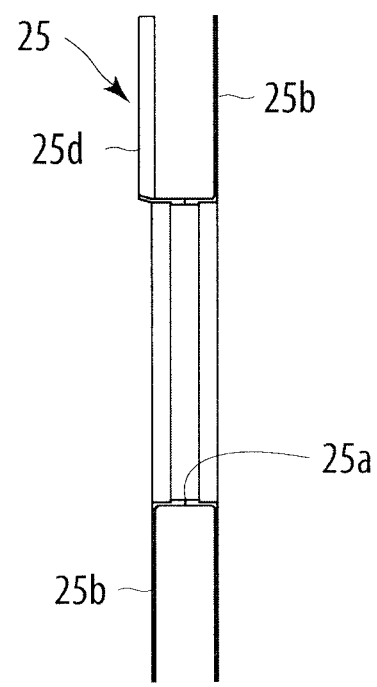

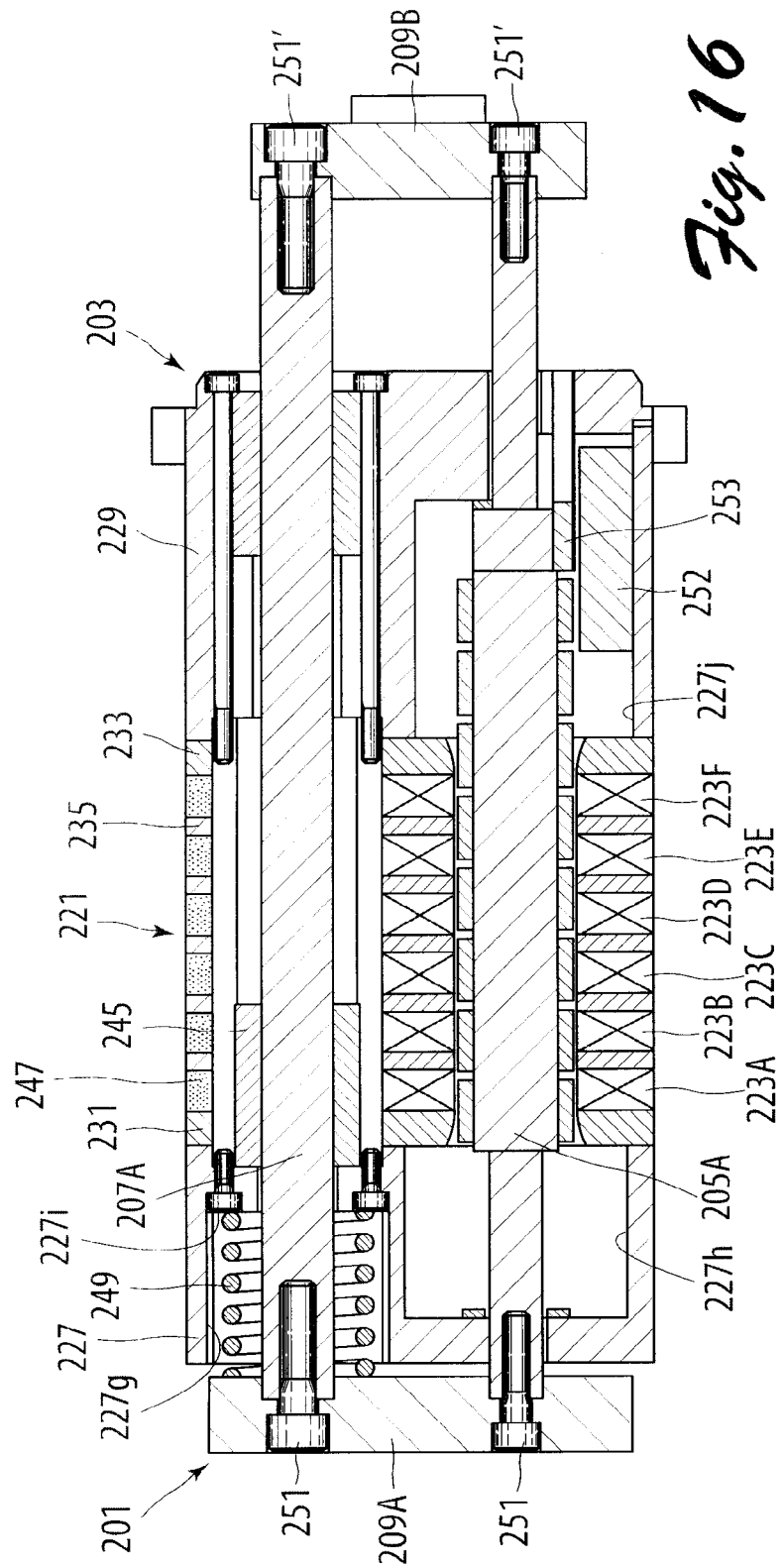

LINEAR SYNCHRONOUS MOTOR

TECHNICAL FIELD

The present invention relates to a linear synchronous motor in which a mover linearly moves relative to a stator.

BACKGROUND ART

Japanese Patent Application Publication No. 2001-286122 (JP2001-286122A) discloses a linear synchronous motor comprising a stator and a mover that linearly moves relative to the stator. The mover includes a direct drive shaft configured to reciprocate in an axial direction and an array of permanent magnets including a plurality of permanent magnets fixed to the direct drive shaft. The stator includes a plurality of windings and a stator core unit having slots formed therein for receiving the plurality of annular windings. The annular windings are each formed of an annularly wound winding conductor and are disposed so as to surround the direct drive shaft. The stator core unit is constituted from a plurality of stator core divided bodies assembled with each other in the axial direction. The stator core divided bodies are formed by cutting work, and each of the stator core divided bodies includes a magnetic pole portion facing the permanent magnet array of the mover and a cylindrical yoke element which is combined with another stator core divided body so as to constitute a yoke for magnetically connecting the magnetic pole portions. One winding is disposed between two adjacent magnetic pole portions.

In a linear synchronous motor disclosed in Japanese Patent Application Publication No. 2005-328598A (JP2005-328598A), a mover includes two direct drive shafts formed of a magnetic conductive material, and a stator includes two arrays of windings formed to surround the two direct drive shafts. Arrays of permanent magnets fixed to the two direct drive shafts are disposed to be shifted from each other by an electrical angle of 180°. The two arrays of windings are excited, with the two arrays of permanent magnets being shifted by an electrical angle of 180°. In this linear synchronous motor, a magnetic flux flows within the two direct drive shafts formed of the magnetic conductive material. Accordingly, there is no need for the cylindrical yoke element as used in the linear synchronous motor in JP2001-286122A.

In the linear synchronous motor in JP2005-328598A, however, the magnetic flux is flown through the two direct drive shafts and each core. Thus, the magnetic flux may be flown in a locally concentrated state, so that magnetic saturation may occur. Further, a magnetic circuit between the cores is not closed, so that magnetic flux leakage tends to occur. For that reason, even if the two direct drive shafts are used, a thrust force of the linear synchronous motor cannot be sufficiently increased. Further, in the linear synchronous motor in JP2005-328598A, a mover stage for mounting the mover and a base for disposing the stator are provided. Then, the mover stage is slidably supported relative to the base. For that reason, a support structure for supporting the mover relative to the stator becomes extensive, so that the volume occupied by the linear synchronous motor increases.

SUMMARY OF THE INVENTION

An object of the present invention is to provide a linear synchronous motor in which magnetic leakage and magnetic saturation may be prevented, thereby allowing a thrust force of the linear synchronous motor to be sufficiently increased.

Another object of the invention is to provide a linear synchronous motor including a simplified support structure for supporting a mover relative to a stator, thereby allowing reduction of the volume occupied by the linear synchronous motor.

A still another object of the invention is to provide a linear synchronous motor of which the axial length may be reduced.

A yet another object of the invention is to provide a linear synchronous motor in which one of connecting members that connects direct drive shafts may be prevented from falling toward a stator core unit even if the linear synchronous motor is used such that axes of the direct drive shafts extend in a vertical direction.

A linear synchronous motor of the present invention includes a mover and a stator. The mover includes first and second direct drive shafts configured to reciprocate in an axial direction; and first and second arrays of permanent magnets respectively mounted on the first and second direct drive shafts. The stator includes first and second arrays of windings and a stator core unit. The first array of windings is constituted from the windings disposed at predetermined intervals in the axial direction to surround the first direct drive shaft. The second array of windings is constituted from the windings disposed at predetermined intervals in the axial direction to surround the second direct drive shaft. The stator core unit includes an array of divided cores and a yoke. The array of divided cores each integrally includes a first magnetic pole portion disposed to surround the first direct drive shaft concentrically with the first direct drive shaft and a second magnetic pole portion disposed to surround the second direct drive shaft concentrically with the second direct drive shaft. The divided cores are disposed at intervals in the axial direction such that two adjacent divided cores define a space therebetween where one of the first array of windings and one of the second array of windings are disposed. The divided cores each include at least one pair of connected portions. The at least one pair of connected portions of each divided core is disposed along the first and second direct drive shafts to form at least one pair of connected portion arrays. The yoke magnetically connects the divided cores. The yoke includes at least one pair of yoke elements formed of a magnetic conductive material. The at least one pair of yoke elements mechanically and magnetically connect the connected portions of the at least one pair of connected portion arrays. The "magnetic conductive material" herein denotes a magnetic material capable of forming a magnetic path. The first array of permanent magnets and the second array of permanent magnets are disposed to be shifted from each other by an electrical angle of 180°. The first and second arrays of windings are excited with the first and second arrays of windings being shifted by an electrical angle of 180°.

When currents flow into the first array of windings and the second array of windings in the linear synchronous motor of the present invention, three closed magnetic circuits are formed between the two adjacent divided cores. The three closed magnetic circuits are formed by a magnetic flux that flows through the first array of permanent magnets, the two adjacent divided cores, and the at least one pair of yoke elements, a magnetic flux that flows through the first and second arrays of permanent magnets and the two adjacent divided cores, and a magnetic flux that flows through the second array of permanent magnets, the two adjacent divided cores, and the at least one pair of yoke elements. For that reason, magnetic flux leakage and magnetic saturation may be prevented. A thrust force of the linear synchronous motor may be sufficiently increased.

The at least one pair of connected portions is provided at each of the divided cores, and the yoke is constituted from the at least one pair of yoke elements connected to the at least one pair of connected portions. Thus, the configuration of the yoke that magnetically connects the divided cores may be simplified. Further, the yoke is integrally formed of the magnetic conductive material. With this arrangement, magnetic loss may be reduced.

The linear synchronous motor of the present invention further comprises first and second linear bearings, first and second guide shafts, and first and second connecting members. The first and second linear bearings are fixed to the stator core unit. The "linear bearing" herein denotes a bearing such as a linear guide for supporting a shaft body to allow the shaft body to reciprocate relative to a supported portion in the axial direction. The first bearing herein comprises a pair of linear bearings that support the first guide shaft, while the second bearing herein comprises a pair of linear bearings that support the second guide shaft. The first and second guide shafts are slidably supported by the first and second linear bearings. Ends of the first and second direct drive shafts and ends of the first and second guide shafts are connected to the first connecting member, all of the ends being located on the same axial end side. The other ends of the first and second direct drive shafts and the other ends of the first and second guide shafts are connected to the second connecting member, the other ends being located on the other axial end side. With this arrangement, when the first and second direct drive shafts reciprocate relative to the stator in the axial direction, the first and second guide shafts connected to the first and second direct drive shafts via the first and second connecting members slide relative to a pair of magnetic cylindrical members via the linear bearings. When the first and second guide shafts are slidably supported by the first and second linear bearings in this manner, a support structure for supporting the mover relative to the stator may be simplified. The volume occupied by the linear synchronous motor may be thereby reduced. Further, there is no need for supporting the first and second direct drive shafts by both ends of the stator core unit. The axial length of the linear synchronous motor may be therefore reduced. Further, the first and second guide shafts are slidably supported by the first and second of linear bearings apart from the first and second direct drive shafts. Accordingly, even if lubricating oil is poured into the linear bearings that support the mover, there is no problem of attachment of the lubricating oil onto members in the vicinity of the first and second direct drive shafts.

Further, in this case, a majority of or all of the divided cores should be formed by laminating a plurality of magnetic steel plates of a predetermined shape in the axial direction. The "majority of the divided cores" herein denote a plurality of intermediate divided cores except for outermost end divided cores located at both end portions of the first and second direct drive shafts in the axial direction. With this arrangement, the manufacturing cost of the stator may be reduced more than when the magnetic material is cut to form all magnetic pole portions. Further, magnetic loss and iron loss that will occur in the stator core unit may be reduced.

Preferably, the at least one pair of yoke elements are formed of a pair of magnetic cylindrical members, and the first and second linear bearings may be disposed inside the pair of magnetic cylindrical members respectively. With this arrangement, the pair of magnetic cylindrical members achieve both of functions of the yoke elements and support members that support the guide shafts. For that reason, when the pair of guide shafts are provided, a support structure for supporting the guide shafts may be formed of a small number of components.

The first and second direct drive shafts and the first and second guide shafts may be disposed based on various positional relationships. For example, the first and second direct drive shafts and the first and second guide shafts may be disposed such that axial lines of the first and second direct drive shafts and axial lines of the first and second guide shafts all lie on the same virtual plane. With this arrangement, it may be possible to reduce dimensions of the linear synchronous motor in a direction orthogonal to a direction where the first and second direct drive shafts and the first and second guide shafts are disposed.

Alternatively, the first and second direct drive shafts and the first and second guide shafts may be disposed such that a virtual plane including an axial line of the first direct drive shaft and an axial line of the second direct drive shaft crosses a virtual plane including an axial line of the first guide shaft and an axial line of the second guide shaft in a region surrounded by the first and second direct drive shafts and the first and second guide shafts. With this arrangement, it may also be possible to reduce dimensions of the linear synchronous motor in a direction where the first and second direct drive shafts are disposed and dimensions of the linear synchronous motor in a direction where the first and second guide shafts are disposed.

Preferably, a spring mechanism is provided between one of the first and second connecting members and the stator core unit. The spring mechanism is configured to generate a biasing force for biasing the one of the first and second connecting members in a direction apart from the stator core unit when the one of the first and second connecting members approaches the stator core unit. Assume that the linear synchronous motor is used such that axes of the first and second direct drive shafts extend in a vertical direction. Then, by positioning the one of the first and second connecting members in an upper location relative to the other of the first and second connecting members, the one of the first and second connecting members may be prevented from falling toward the stator core unit by the spring mechanism configured as described above.

The stator core unit may include an end bracket disposed at at least one end of the array of divided cores in the axial direction. In this case, it may be so arranged that the end bracket includes a concave portion formed therein. The concave portion surrounds one of the first and second direct drive shafts and opens toward the array of divided cores. Then, a linear sensor fixed to the end bracket may be disposed in the concave portion. Further, a linear scale may be mounted on the one of the first and second direct drive shafts to face the linear sensor. It may be then so arranged that the linear sensor and the linear scale work together to detect a position of the mover. With this arrangement, by disposing the linear sensor in the concave portion, the size of the linear synchronous motor may become compact.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

FIG. 5C is a right side view of the bobbin used in the linear synchronous motor shown in FIG. 1.

FIG. 16 is a sectional view taken along line XVI-XVI in FIG. 14.

DETAILED DESCRIPTION OF PREFERRED EMBODIMENTS

Figure 1:
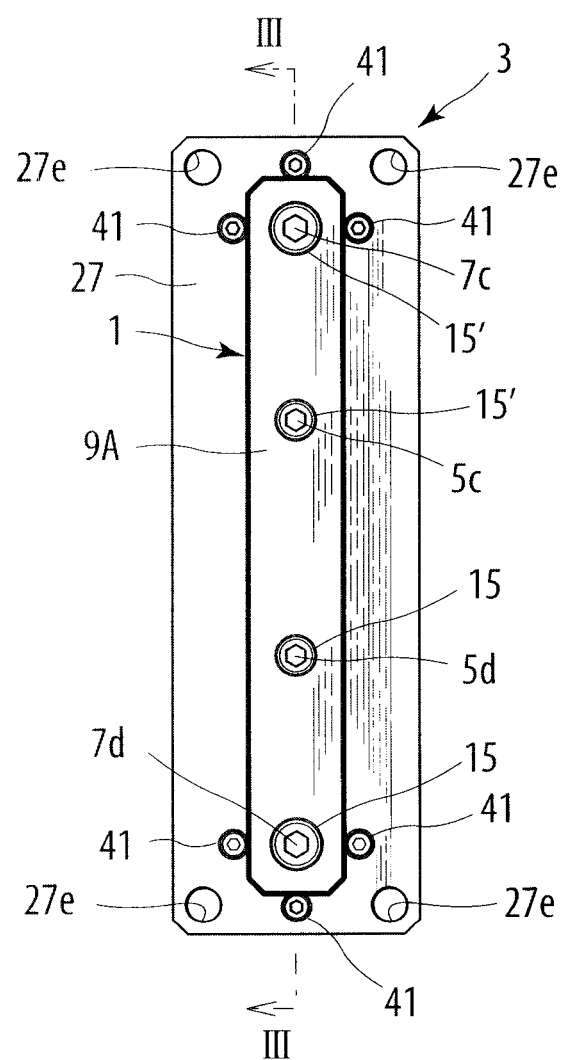
FIG. 1 is a front view of a linear synchronous motor in an embodiment of the present invention.
Figure 2:
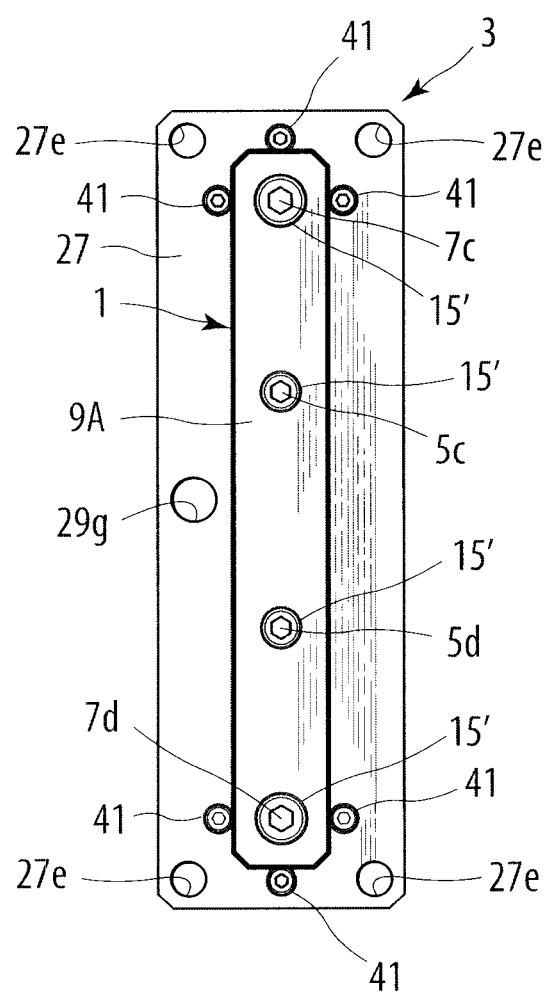
FIG. 2 is a rear view of the linear synchronous motor shown in FIG. 1.
Figure 3:
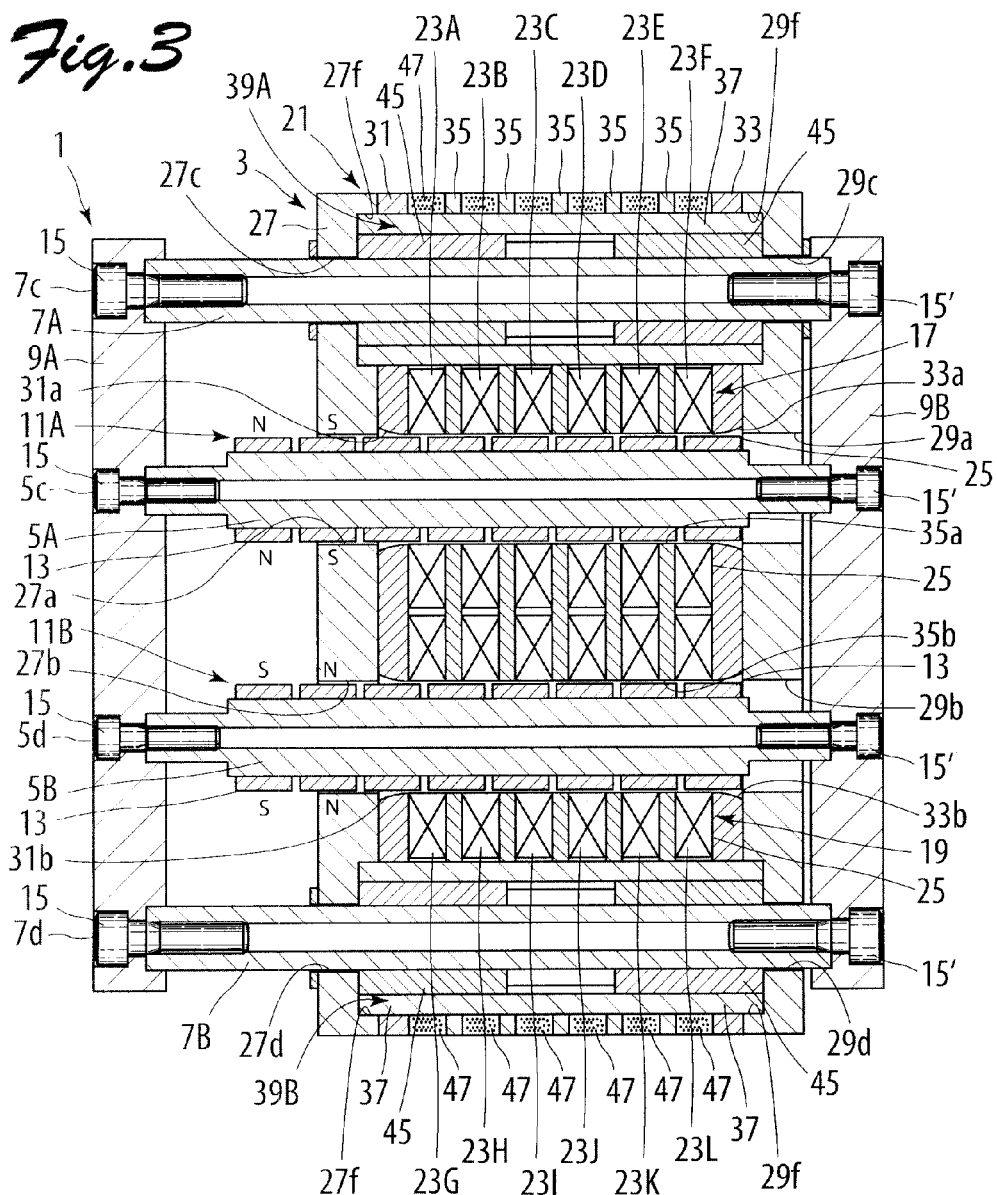
FIG. 3 is a sectional view taken along line III-III in FIG. 1.

Examples of embodiments of the present invention will be described below in detail. FIGS. 1 and 2 are respectively a front view and a rear view of a linear synchronous motor in an embodiment of the present invention. FIG. 3 is a sectional view taken along line III-III in FIG. 1. The linear synchronous motor in this embodiment includes a mover 1 and a stator 3, as shown in FIG. 3. The mover 1 includes a first direct drive shaft 5A and a second direct drive shaft 5B, a first guide shaft 7A and a second guide shaft 7B, and a first connecting member 9A and a second connecting member 9B. Each of the first and second direct drive shafts 5A and 5E is made of a magnetic conductive material, has an elongate cylindrical shape, and reciprocates in an axial direction thereof. A first array of permanent magnets 11A is arranged on an outer peripheral surface of the first direct drive shaft 5A, while a second array of permanent magnets 11B is arranged on an outer peripheral surface of the second direct drive shaft 5B. The first array of permanent magnets 11A comprises eight circular annular permanent magnets 13 fitted with the outer peripheral surface of the first direct drive shaft 5A and arranged in the axial direction of the first direct drive shaft 5A. The second array of permanent magnets 11B comprises eight circular annular permanent magnets 13 fitted with the outer peripheral surface of the second direct drive shaft 5B and arranged in the axial direction of the second direct drive shaft 5B. The eight permanent magnets are constituted from four circular annular permanent magnets magnetized such that N-pole appears on a radially outer surface of the first direct drive shaft 5A or the second direct drive shaft 5B, and four circular annular permanent magnets magnetized such that S-pole appears on the radially outer surface of the first direct drive shaft 5A or the second direct drive shaft 5B. These eight permanent magnets are arranged such that the N-pole and the S-pole alternately appear in the axial direction. The first array of permanent magnets 11A and the second array of permanent magnets 11B are disposed to be shifted from each other by an electrical angle of 180°. Specifically, a permanent magnet 13 in the first array of permanent magnets 11A is arranged in a position corresponding to that of a permanent magnet 13 having a different polarity in the second array of permanent magnets 11B in a direction orthogonal to the axial direction. In this embodiment, one permanent magnet 13 is constituted from six circular arc-shaped permanent magnet pieces arranged in a peripheral direction of each of the direct drive shafts 5A, 5B. The permanent magnet pieces are fixed to each of the first and second direct drive shafts 5A and 5B by adhesive. The permanent magnets may be directly fixed to the outer peripheral surfaces of the direct drive shafts 5A, 5B as in this embodiment. Alternatively, the permanent magnets may be indirectly fixed to the direct drive shafts 5A, 5B. For example, a magnet mounting portion may be fixed to the outer peripheral surface of each of the direct drive shafts 5A, 5B, and the array of permanent magnets (or a plurality of permanent magnets) may be fixed to the magnet mounting portion.

Each of the first and second guide shafts 7A, 7B is made of stainless steel, and has an elongated cylindrical shape. The first and second guide shafts 7A, 7B are disposed to extend in parallel with the direct drive shafts 5A, 5B. The first and second guide shafts 7A, 7B are then connected to the first and second direct drive shafts 5A, 5B via the first and second connecting members 9A, 9B. Each of the first and second guide shafts 7A, 7B is slidably supported by a pair of linear bearings 45. The pair of the linear bearings 45 are provided in each of a pair of magnetic cylindrical members 37 which will be described later. A structure by which the first and second guide shafts 7A, 7B slide within the pair of magnetic cylindrical members 37 will be described later in detail.

The first connecting member 9A is made of aluminum. As shown in FIG. 1, the first connecting member 9A has an elongated rectangular shape extending in a vertical direction on the page of FIG. 1. Ends of the first and second direct drive shafts 5A, 5B and ends of the first and second guide shafts 7A, 7B are connected to the first connecting member 9A by four screws 15, all the ends of the shafts being located on the same axial end side. The second connecting member 9B is also made of aluminum. As shown in FIG. 2, the second connecting member 9B has an elongated rectangular shape extending in a vertical direction on the page of FIG. 2, like the first connecting member 9A. The other ends of the first and second direct drive shafts 5A, 5B and the other ends of the first and second guide shafts 7A, 7B are connected to the second connecting member 9B by four screws 15', all the ends of the shafts being located on the other axial end side. With this arrangement, the first and second direct drive shafts 5A, 5B and the first and second guide shafts 7A, 7B are disposed such that an axial line 5c of the first direct drive shaft 5A, an axial line 5d of the second direct drive shaft 5B, an axial line 7c of the first guide shaft 7A, and an axial line 7d of the second guide shaft 7B all lie on the same virtual plane.

Figure 4:
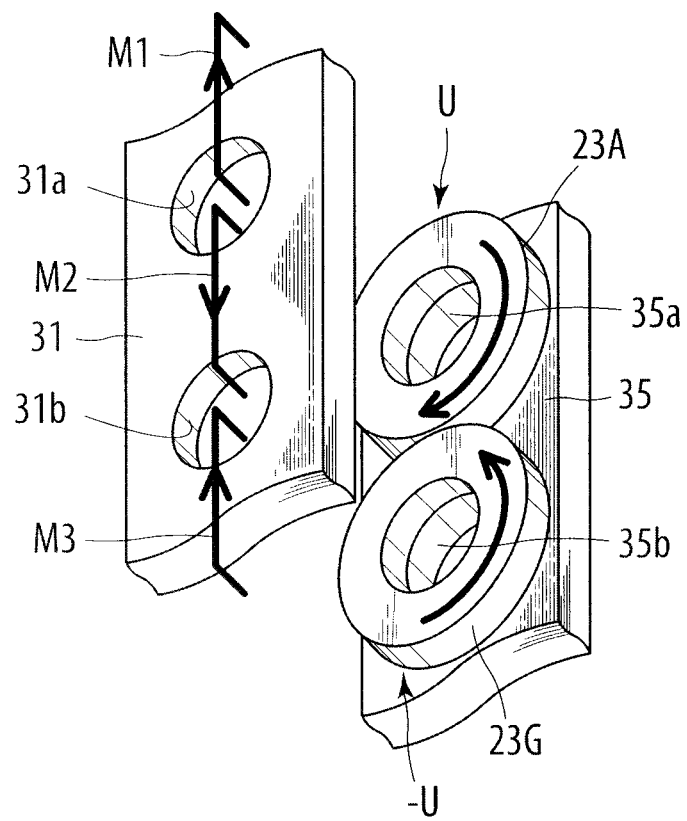
FIG. 4 explains flows of magnetic fluxes in the linear synchronous motor shown in FIG. 1.
Figure 5A:
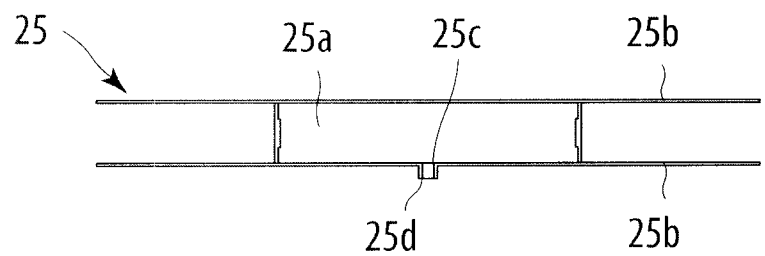
FIG. 5A is a plan view of a bobbin used in the linear synchronous motor shown in FIG. 1.
Figure 5B:
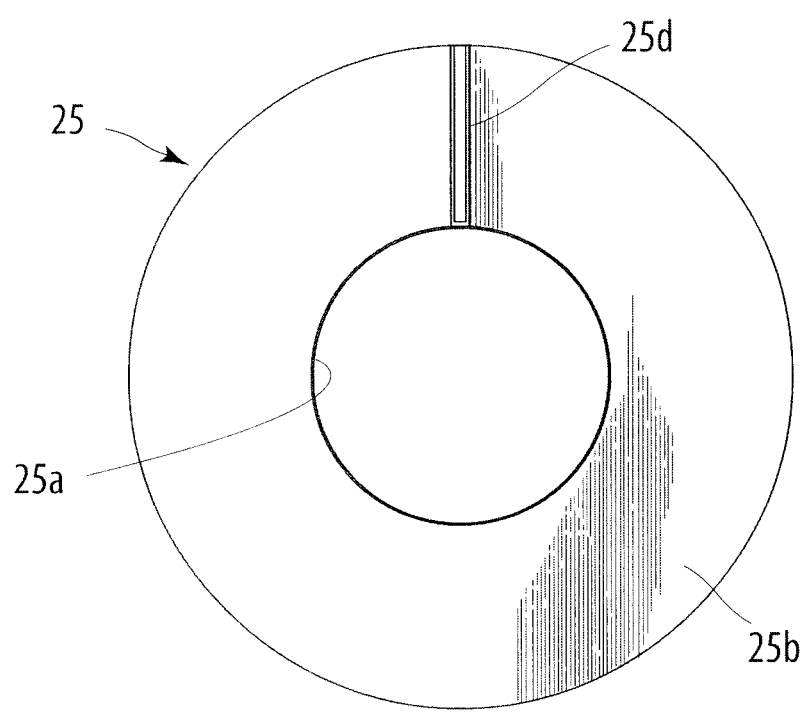
FIG. 5B is a front view of the bobbin used in the linear synchronous motor shown in FIG. 1.

As shown in FIG. 3, the stator 3 includes a first array of windings 17, a second array of windings 19, and a stator core unit 21. The first array of windings 17 is constituted from six windings 23A to 23F, while the second array of windings 19 is constituted from six windings 23G to 23L. The windings 23A to 23L are each formed of an annularly wound winding conductor. The windings 23A to 23F of the first array of windings 17 are arranged at intervals in the axial direction of the first direct drive shaft 5A to surround the first direct drive shaft 5A. The windings 23G to 23L of the second array of windings 19 are arranged at intervals in the axial direction of the second direct drive shaft 5B to surround the second direct drive shaft 5B. Three phases, U phase, V phase, and W phase, of excitation currents mutually shifted by an electrical angle of 120° flow into the six windings 23A to 23F of the first array of windings 17 and the six windings 23G to 23L of the second array of windings 19. The first array of windings 17 and the second array of windings 19 are excited, with the first array of windings 17 and the second array of windings 19 being shifted by an electrical angle of 180°. For example, as shown in FIG. 4, one winding 23A of the first array of windings 17 and one winding 23G of the second array of windings 19 adjacent to the winding 23A are excited, with the winding 23A and the winding 23G being shifted by an electrical angle of 180°. More specifically, the excitation currents of U phase, −U phase, −V phase, V phase, W phase, and −W phase respectively flow into the windings 23A to 23F of the first array of windings 17, and the excitation currents of −U phase, U phase, V phase, −V phase, −W phase, and W phase respectively flow into the windings 23G to 23L of the second array of windings 19. Each of the windings 23A to 23L is held in a bobbin 25 shown in each of FIGS. 5A to 5C. The bobbin 25 is made of an insulating synthetic resin material that insulates the windings 23A to 23L from divided cores 31, 33, 35 which will be described later. The bobbin 25 includes in a central portion thereof a cylindrical portion 25a through which the direct drive shafts 5A, 5B pass, and a pair of flange portions 25b. The pair of flange portions 25b are unitarily provided at both ends of the cylindrical portion 25a and extends in the direction orthogonal to the axial direction of the direct drive shafts 5A, 5B. A slot portion 25c is formed in one of the pair of flange portions 25. The slot portion 25c radially extends to lead out the winding-start end of the lead hire of each of the windings 23A to 23L radially outward of the flange portions of the bobbin 25. Then, a protruding portion 25d protruding in a direction away from the other of the pair of flange portions 25b is unitarily formed on the one of the pair of flange portions 25b. The slot portion 25c is formed inside the projecting portion 25d. The winding-start lead wire of each of the windings 23A to 23L lead out through the slot portion 25c is received in the protruding portion 25d. The bobbins 25 which receive the windings 23A to 23L therein are shaped and dimensioned to allow insertion between two adjacent divided cores 31, 33, 35 comprising a pair of end divided cores 31, 33 and five intermediate divided cores 35 that will be described later.

The stator core unit 21 with the first array of windings 17 and the second array of windings 19 arranged therein includes a pair of end brackets 27, 29, the pair of end divided cores 31, 33, the five intermediate divided cores 35, and the pair of magnetic cylindrical members 37. In this embodiment, the pair of end divided cores 31, 33 and the five intermediate divided cores 35 form an array of divided cores.

The pair of end brackets 27, 29 are both formed by cutting a non-magnetic material such as an aluminum plate, and have substantially a rectangular contour, as shown in FIGS. 1 and 2. Through-holes 27a and 27b through which the first direct drive shaft 5A and the second direct drive shaft 5B respectively pass are formed in a central portion of the end bracket 27, which is one of the pair of end brackets 27, 29, as shown in FIG. 3. Through-holes 27c and 27d through which the first guide shaft 7A and the second guide shaft 7B respectively pass are respectively formed in upper and lower portions of the end bracket 27 as shown on the page of FIG. 3. In this embodiment, the through-holes 27c, 27d form a pair of connected portions of the end bracket 27. Further, through-holes 27e for mounting a fixture are formed at four corners of the end bracket 27, as shown in FIG. 1. Annular concave portions 27f formed concentrically with the through-holes 27c and 27d and opening toward the end divided core 31 are formed in the peripheries of portions of the through-holes 27c and 27d. End portions of the pair of magnetic cylindrical members 37 are fitted into these concave portions 27f, the end portions being located on the same axial end side.

Through-holes 29a, 29b through which the first direct drive shaft 5A and the second direct drive shaft 5B respectively pass are formed in a central portion of the end bracket 29 as well, which is the other of the pair of end brackets 27, 29. Through-holes 29c, 29d through which the first guide shaft 7A and the second guide shaft 7B respectively pass are respectively formed in upper and lower portions of the end bracket 29 as shown on the page of FIG. 3. In this embodiment, the through-holes 29c, 29d form a pair of connected portions of the end bracket 29. Annular concave portions 29f formed concentrically with the through-holes 29c, 29d and opening toward the end divided core 33 are formed in the peripheries of portions of the through-holes 29c, 29d. The other end portions of the pair of magnetic cylindrical members 37 are fitted into these concave portions 29f, the end portions being located on the other axial end side. Further, as shown in FIG. 2, a lead wire lead-out hole 29g for allowing a lead wire bundle to pass therethrough is formed in the end bracket 29. The lead wire bundle is a bundle of lead wires electrically connected to winding conductors of the windings 23A to 23L.

Figure 6:
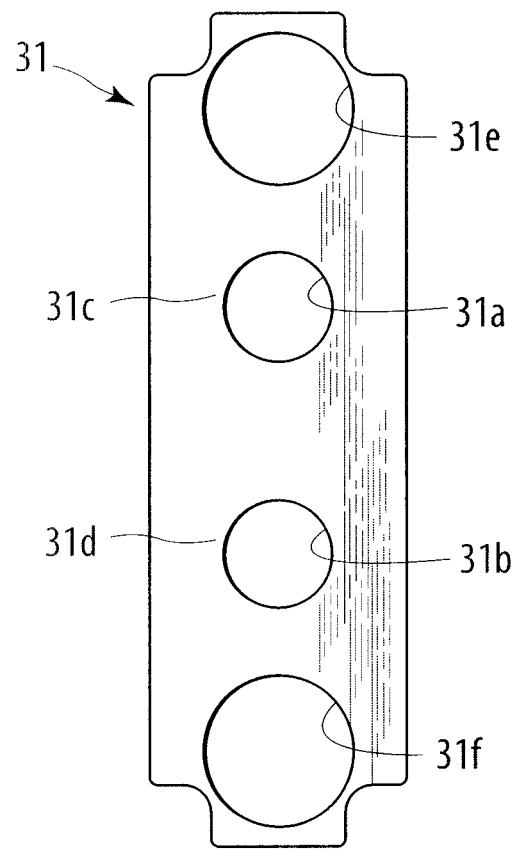
FIG. 6 is a plan view of one of end divided cores used in the linear synchronous motor shown in FIG. 1.

The pair of end divided cores 31, 33 are both formed by cutting a magnetic steel plate and each have substantially a rectangular contour. As shown in FIG. 6, through-holes 31a, 31b through which the first direct drive shaft 5A and the second direct drive shaft 5B respectively pass are formed in a central portion of the end divided core 31, which is one of the pair of end divided cores 31, 33. Inner peripheral surfaces of the through-holes 31a, 31b constitute magnetic pole surfaces respectively facing the first and second arrays of permanent magnets 11A, 11B of the mover 1 each with a predetermined spacing therebetween. For this reason, the end divided core 31 integrally includes as a one-piece structure a first magnetic pole portion 31c disposed concentrically with the first direct drive shaft 5A and a second magnetic pole portion 31d disposed concentrically with the second direct drive shaft 5B. As shown in FIG. 3, inner peripheral wall surfaces, which are magnetic pole surfaces, of the through-holes 31a, 31b are inclined so that, the more the through-holes 31a, 31b are apart from the adjacent intermediate divided core 35 in the axial direction, the more the spacing between the first array of permanent magnets 11A and the inner peripheral wall surface of the through-hole 31a and the spacing between the second array of permanent magnets 11B and the inner peripheral surface of the through-hole 31b increase. Through-holes 31e, 31f through which the pair of magnetic cylindrical members 37 pass are respectively formed in upper and lower portions of the end divided core 31 as shown on the page of FIG. 6. In this embodiment, the through-holes 31e, 31f constitute a pair of connected portions of the end divided core 31.

Figure 7:
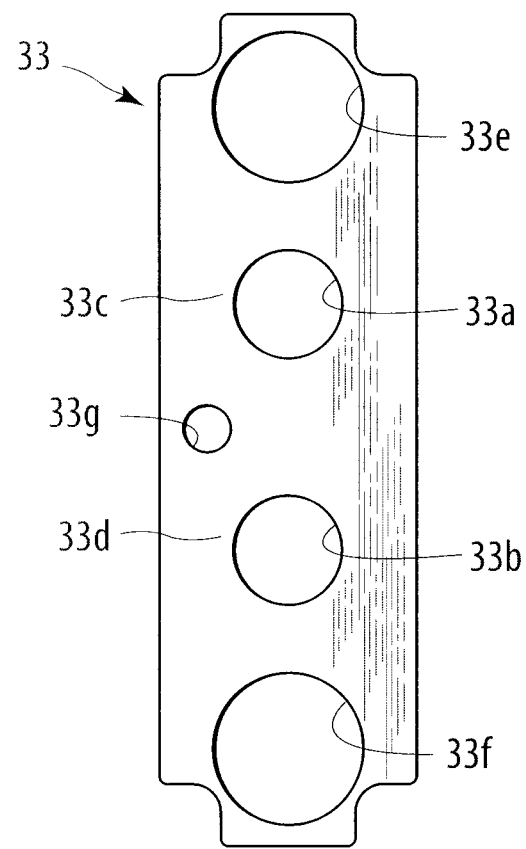
FIG. 7 is a plan view of the other of the end divided cores used in the linear synchronous motor shown in FIG. 1.

As shown in FIG. 7, through-holes 33a, 33b through which the first direct drive shaft 5A and the second direct drive shaft 5B respectively pass are formed in a central portion of the end divided core 33 as well, which is the other of the pair of end divided cores 31,33. Inner peripheral surfaces of the through-holes 33a, 33b constitute magnetic pole surfaces respectively facing the first and second arrays of permanent magnets 11A, 11B of the mover 1 each with a predetermined spacing therebetween. For this reason, the end divided core 33 integrally includes as a one-piece structure a first magnetic pole portion 33c disposed concentrically with the first direct drive shaft 5A and a second magnetic pole portion 33d disposed concentrically with the second direct drive shaft 5B. As shown in FIG. 3, inner peripheral wall surfaces, which are magnetic pole surfaces, of the through-holes 33a, 33b are inclined such that, the more the through-holes 33a, 33b are apart from the adjacent intermediate divided core 35 in the axial direction, the more the spacing between the first array of permanent magnets 11A and the inner peripheral wall surface of the through-hole 33a and the spacing between the second array of permanent magnets 11B and the inner peripheral surface of the through-hole 33b increase. Through-holes 33e, 33f through which the pair of magnetic cylindrical members 37 pass are respectively formed in upper and lower portions of the end divided core 33 as shown on the page of FIG. 7. In this embodiment, the through-holes 33e, 33f constitute a pair of connected portions of the end divided core 33. A lead wire through-hole 33g through which lead wires pass together with a resin is formed in the vicinity of an edge portion of the end divided core 33.

Figure 8:
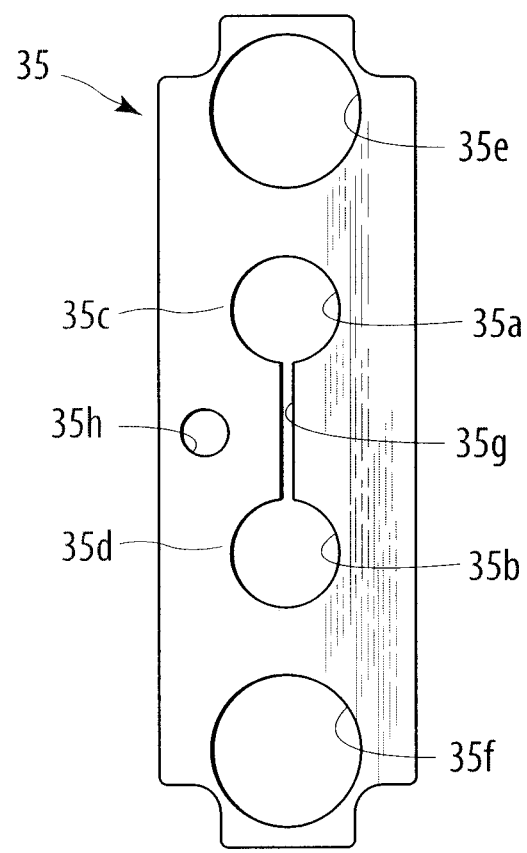
FIG. 8 is a plan view of an intermediate divided core used in the linear synchronous motor shown in FIG. 1.

Each of the five intermediate divided cores 35 has substantially a rectangular contour, as shown in FIG. 8. The five intermediate divided cores are formed by laminating a plurality of magnetic steel plates in the axial direction of the direct drive shafts 5A5B. As shown in FIG. 3, the five intermediate divided cores 35 are arranged between the one end divided core 31 and the other end divided core 33 in the axial direction. As shown in FIG. 8, through-holes 35a, 35b through which the first direct drive shaft 5A and the second direct drive shaft 5B respectively pass are formed in a central portion of each intermediate core 35. Inner peripheral surfaces of the through-holes 35a, 35b constitute magnetic pole surfaces respectively facing the first and second arrays of permanent magnets 11A, 11B of the mover 1 each with a predetermined spacing therebetween. For this reason, the intermediate divided core 35 integrally includes as a one-piece structure a first magnetic pole portion 35c disposed concentrically with the first direct drive shaft 5A and a second magnetic pole portion 35d disposed concentrically with the second direct drive shaft 5B. Through-holes 35e, 35f through which the pair of magnetic cylindrical members 37 pass are respectively formed in upper and lower portions of the intermediate divided core 35 as shown on the page of FIG. 8. In this embodiment, the through-holes 35e and 35f constitute a pair of connected portions of the intermediate divided core 35. A bobbin fitting groove 35g to be fitted with the protruding portion 25d of the bobbin 25 is formed between the through-holes 35a, 35b through which the first and second direct drive shafts 5A and 5B respectively pass. A lead wire through-hole 35h through which lead wires pass together with the resin is formed in the vicinity of an edge portion of the intermediate divided core 35. In this embodiment, the five intermediate divided cores 35 constitute a majority of the plurality of divided cores 31, 33, 35. The one end divided core 31, the other end divided core 33, and the five intermediate divided cores 35 are disposed at intervals in the axial direct ion such that two adjacent divided cores 31, 33, 35 define a space therebetween where one of the windings 23A to 23F of the first array of windings 17 and one of the windings 23G to 23L of the second array of windings 19 are disposed.

When the pair of end brackets 27, 29, the pair of end divided cores 31, 33, the five intermediate divided cores 35, and the first array of windings 17 and the second array of windings 19 are combined, the pair of connected portions, which are formed of the through-holes 27c, 27d, of the end bracket 27, the pair of connected portions, which are formed of the rough-holes 31e, 31f, of the end divided core 31, the pair of connected portions, which are formed of the through-holes 35e, 35f, of each intermediate divided core 35, the pair of connected portions 33e, 33f of the end divided core 33, and the pair of connected portions or through-holes 29c, 29d of the end bracket 29 form two rows in parallel with the direct drive shafts 5A, 5B, thereby forming a first pair of connected portion arrays 39A, 39B shown in FIG. 3. The pairs of connected portions 27c and 27d, 31e and 31f, 35e and 35f, 33e and 33f, 29c and 29d that constitute the first pair of connected portion arrays 39A, 39B are connected by the pair of magnetic cylindrical members 37. Then, as shown in FIG. 1, one end portions of the pair of magnetic cylindrical members 37 are fixed to the end bracket 27, which is one of the end brackets 27, 29, by screws 41. As shown in FIG. 2, the other end portions of the pair of magnetic cylindrical members 37 are fixed to the end bracket 29, which is the other of the end brackets 27, 29, by screws 43.

Each of the pair of magnetic cylindrical members 37 is unitarily formed of a magnetic conductive material, and has a cylindrical shape. The pairs of linear bearings 45 are respectively disposed inside the pair of magnetic cylindrical members 37, as shown in FIG. 3. Then, the first guide shaft 7A of the mover 1 is slidably fitted into one of the pair of magnetic cylindrical members 37 through the pair of linear bearings 45. The second guide shaft 7B of the mover 1 is slidably fitted into the other of the pair of magnetic cylindrical members 37 through the pair of linear bearings 45. With this support structure, the direct drive shafts 5A,5B of the mover 1 are respectively positioned at the centers of the two through-holes, for example 27a and 27b, in the central portion of the stator core unit 21.

The linear synchronous motor in this embodiment is constituted from a pair of yoke elements using the pair of magnetic cylindrical members 37. As a result, a yoke which magnetically connects the divided cores 31, 33, 35 is formed by the pair of magnetic cylindrical members 37.

When the pair of end brackets 27, 29, the pair of end divided cores 31, 33, the five intermediate divided cores 35, the pair of magnetic cylindrical members 37, and the first array of windings 17 and the second array of windings 19 are combined, portions between adjacent two of the divided cores 31, 33, 35 located radially outside of the first array of windings 17 and the second array of windings 19, the lead wire through-holes 35h of the five intermediate divided cores 35, and the lead wire through-hole 33g of the end divided core 33 are filled with a thermosetting synthetic resin 47.

Figure 9:
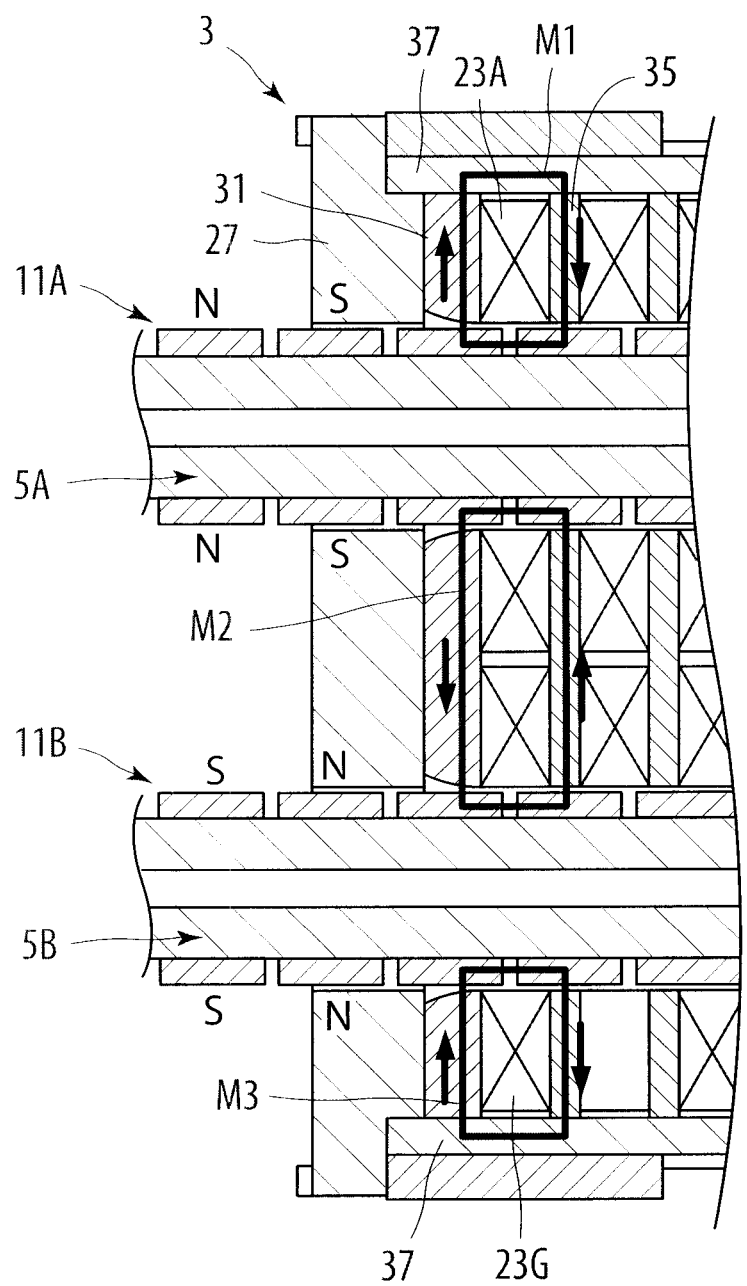
FIG. 9 explains flows of magnetic fluxes in the linear synchronous motor shown in FIG. 1.

When currents flow into the first array of windings 17 and the second array of windings 19 in the linear synchronous motor in this embodiment, magnetic fluxes flow between the respective two adjacent divided cores 31, 33, 35. When the end divided core 31 and the intermediate divided core 35 adjacent to the end divided core 31 are taken as an example, three magnetic circuits M1, M2, and M3 are formed, as shown in FIGS. 4 and 9. The magnetic circuit M1 is formed by a magnetic flux which flows through the first array of permanent magnets 11A, the intermediate divided core 35, one of the pair of magnetic cylindrical members 37, and the end divided core 31. The magnetic circuit M2 is formed by a magnetic flux which flows through the first array of permanent magnets 11A, the intermediate divided core 35, the second array of permanent magnets 11B, and the end divided core 31. The magnetic circuit M3 is formed by a magnetic flux which flows through the second array of permanent magnets 11B, the end divided core 31, the other of the pair of magnetic cylindrical members 37, and the intermediate divided core 35.

When the first direct drive shaft 5A and the second direct drive shaft 5B reciprocate relative to the stator 3 in the axial direction, the first and second guide shafts 7A, 7B connected to the first and second direct drive shafts 5A, 5B via the first and second connecting members 9A, 9B slide relative to the pair of magnetic cylindrical members 37 via the linear bearings 45.

According to the linear synchronous motor in this embodiment, the three closed magnetic flux circuits are formed between the two adjacent divided cores 31, 35, 33. Thus, magnetic flux leakage and magnetic saturation may be prevented, and a thrust force of the linear synchronous motor may be sufficiently increased. The first and second guide shafts 7A, 7B connected to the first and second direct drive shafts 5A, 5B via the first and second connecting members 9A, 9B are slidably supported by the pairs of linear bearings 45. Thus, the support structure for supporting the mover 1 relative to the stator 3 may be simplified, and the volume occupied by the linear synchronous motor may be thereby reduced. Further, the need for supporting the first and second direct drive shafts 5A, 5B by both ends of the stator core unit 21 is eliminated. The axial length of the linear synchronous motor may be therefore reduced.

Figure 10:
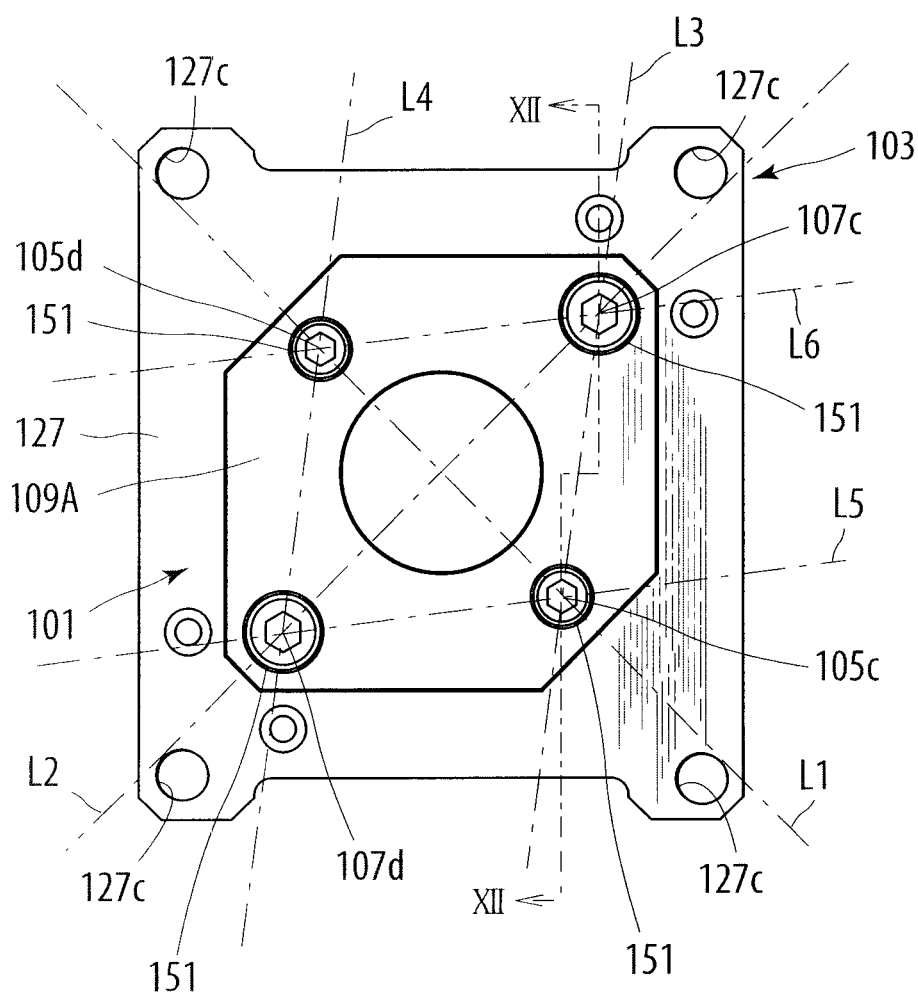
FIG. 10 is a front view of a linear synchronous motor in another embodiment of the present invention.
Figure 11:
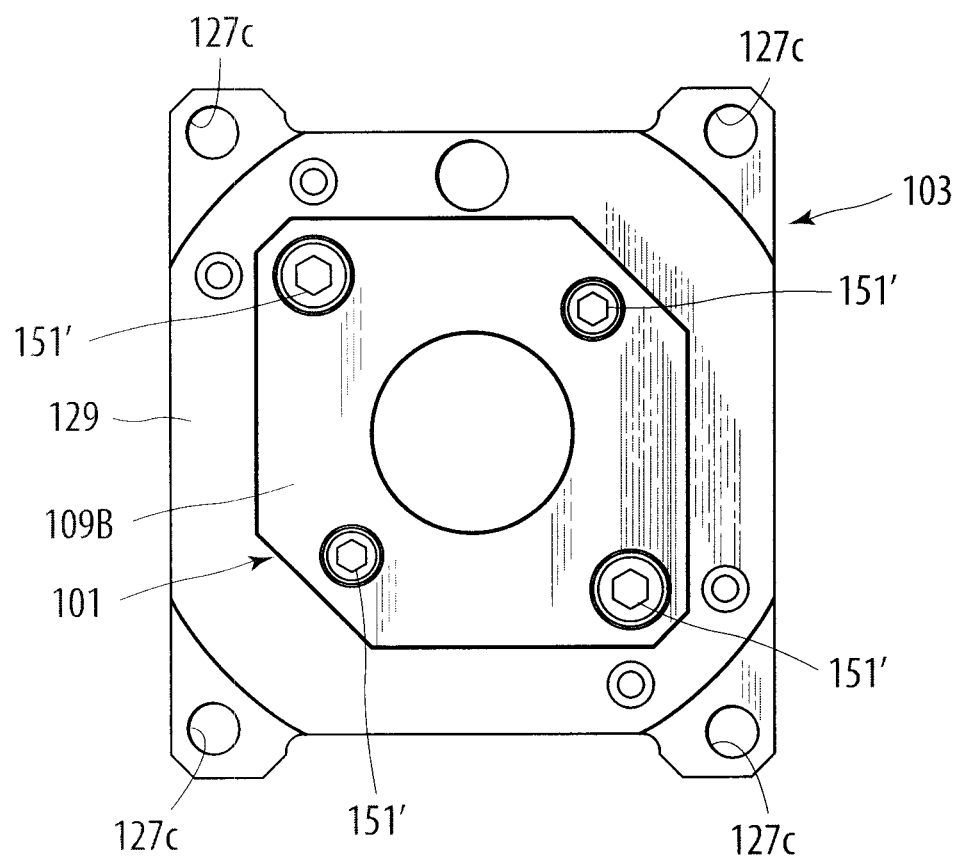
FIG. 11 is a rear view of the linear synchronous motor shown in FIG. 10.
Figure 12:
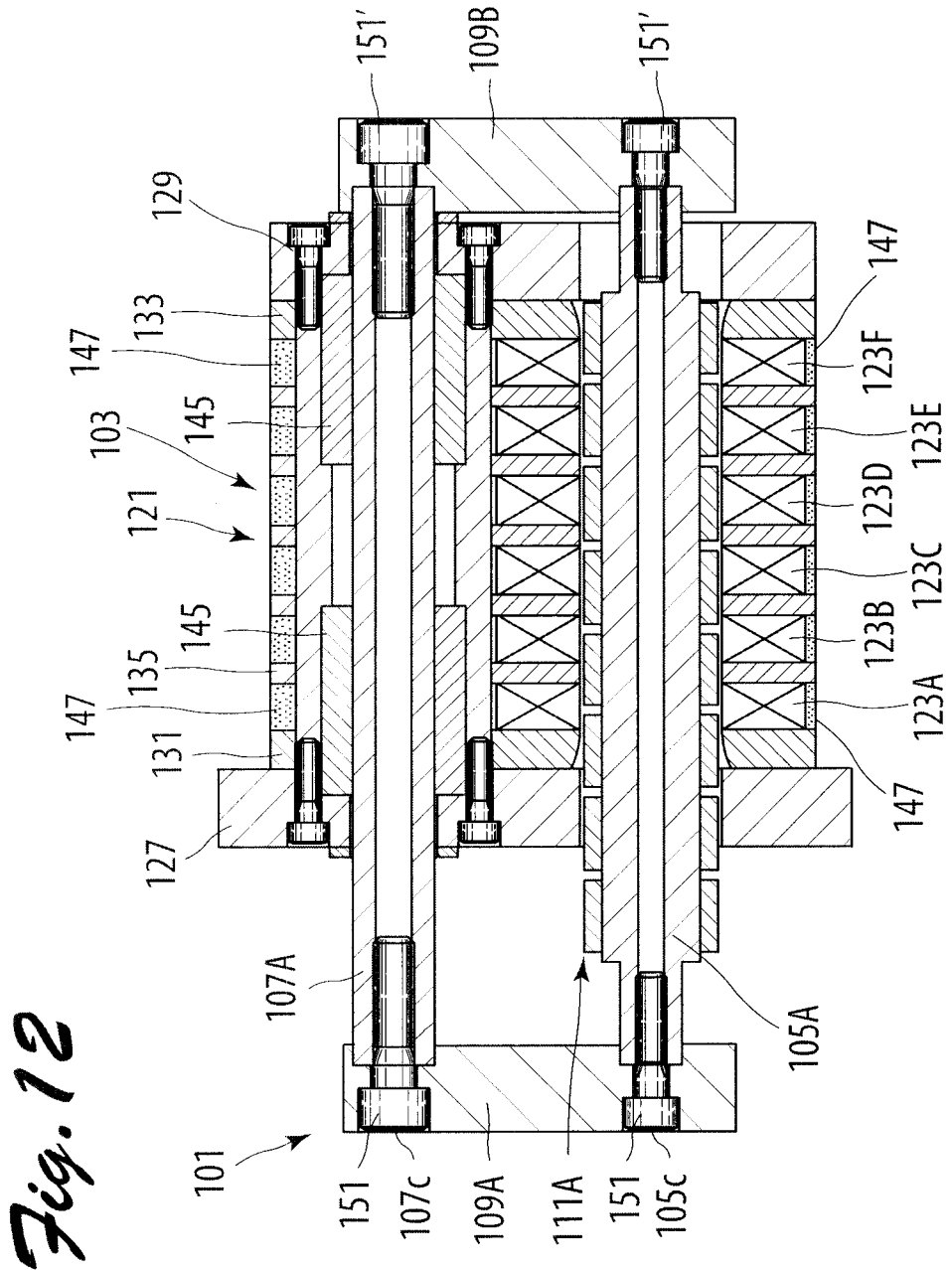
FIG. 12 is a sectional view taken along line XII-XII in FIG. 10.
Figure 13:
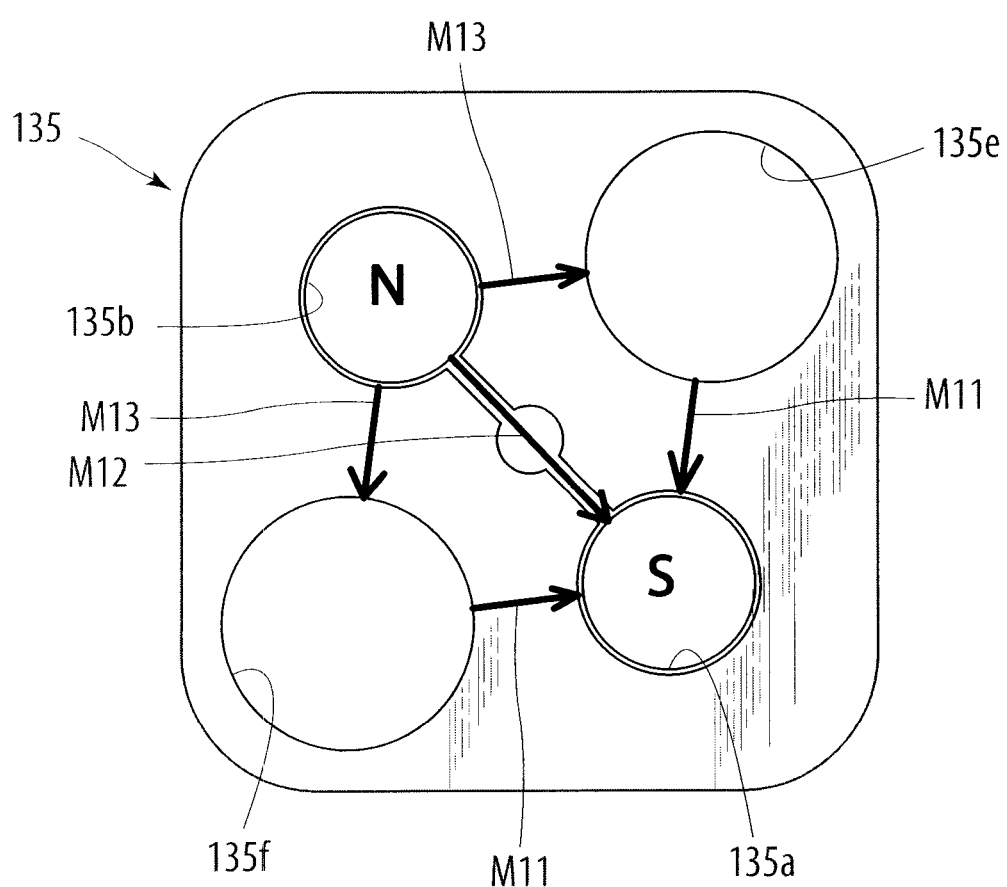
FIG. 13 is a plan view of an intermediate divided core in the linear synchronous motor shown in FIG. 10.

FIGS. 10 and 11 are a front view and a rear view of a linear synchronous motor in another embodiment of the present invention. FIG. 12 is a sectional view taken along line XII-XII in FIG. 10. FIG. 13 is a plan view of an intermediate divided core of the linear synchronous motor shown in FIGS. 10 and 11. Basically, the linear synchronous motor in this embodiment has the same structure as the linear synchronous motor shown in FIGS. 1 to 9 except for disposition of the first and second direct drive shafts and the first and second guide shafts. For that reason, components of the linear synchronous motor in this embodiment similar to or corresponding to those shown in FIGS. 1 to 9 are given reference numerals obtained by adding 100 to the similar or corresponding components in FIGS. 1 to 9, thereby omitting their description. As shown in FIG. 10, the first and second direct drive shafts 105A, 105B and the first and second guide shafts 107A, 107B in the linear synchronous motor in this embodiment are disposed such that a virtual plane L1 and a virtual plane L2 cross each other in a region surrounded by the first and second direct drive shafts 105A, 105B and the first and second guide shafts 197A, 107B. The virtual plane L1 includes an axial line 105c of the first direct drive shaft 105A and an axial line 105d of the second direct drive shaft 105B. The virtual plane L2 includes an axial line 107c of the first guide shaft 107A and an axial line 107d of the second guide shaft 107B. Further, a virtual plane L3 including the axial line 105c of the first direct drive shaft 105A and the axial line 107c of the first guide shaft 107A is in parallel with a virtual plane L4 including the axial line 105d of the second direct drive shaft 105B and the axial line 107d of the second guide shaft 107B. A virtual plane L5 including the axial line 105c of the first direct drive shaft 105A and the axial line 107d of the second guide shaft 107B is in parallel with a virtual plane L6 including the axial line 105d of the second direct drive shaft 105B and the axial line 107c of the first guide shaft 107A.

As shown in FIG. 13, three magnetic circuits M11, M12, and M13 are formed in the linear synchronous motor in this embodiment. The magnetic circuits are indicated by five lines in FIG. 13. Each of the magnetic circuit M11 and the magnetic circuit M13 is divided into two portions to be shown. Referring to FIG. 13, the magnetic circuit M11 is formed by a magnetic flux that flows through a first array of permanent magnets 111A, two adjacent divided cores 131 and 135, 135, or 135 and 133, and a pair of magnetic cylindrical members 137. The magnetic circuit M12 is formed by a magnetic flux that flows through the first array of permanent magnets 111A, the two adjacent divided cores 131, 135, 133, and a second array of permanent magnets 111B. Reference numeral 111B is not shown in the figure, but is assigned to the second array of permanent magnets for convenience of description. The magnetic circuit M13 is formed by a magnetic flux that flows through the second array of permanent magnets 111B, the two adjacent divided cores 131, 133, 135, and the pair of magnetic cylindrical members 137.

According to the linear synchronous motor in this embodiment, it may be possible to reduce dimensions of the linear synchronous motor in a direction where the first and second direct drive shafts 105A, 105B are disposed and dimensions of the linear synchronous motor in a direction where the first and second guide shafts 107A, 107B are disposed.

Figure 14:
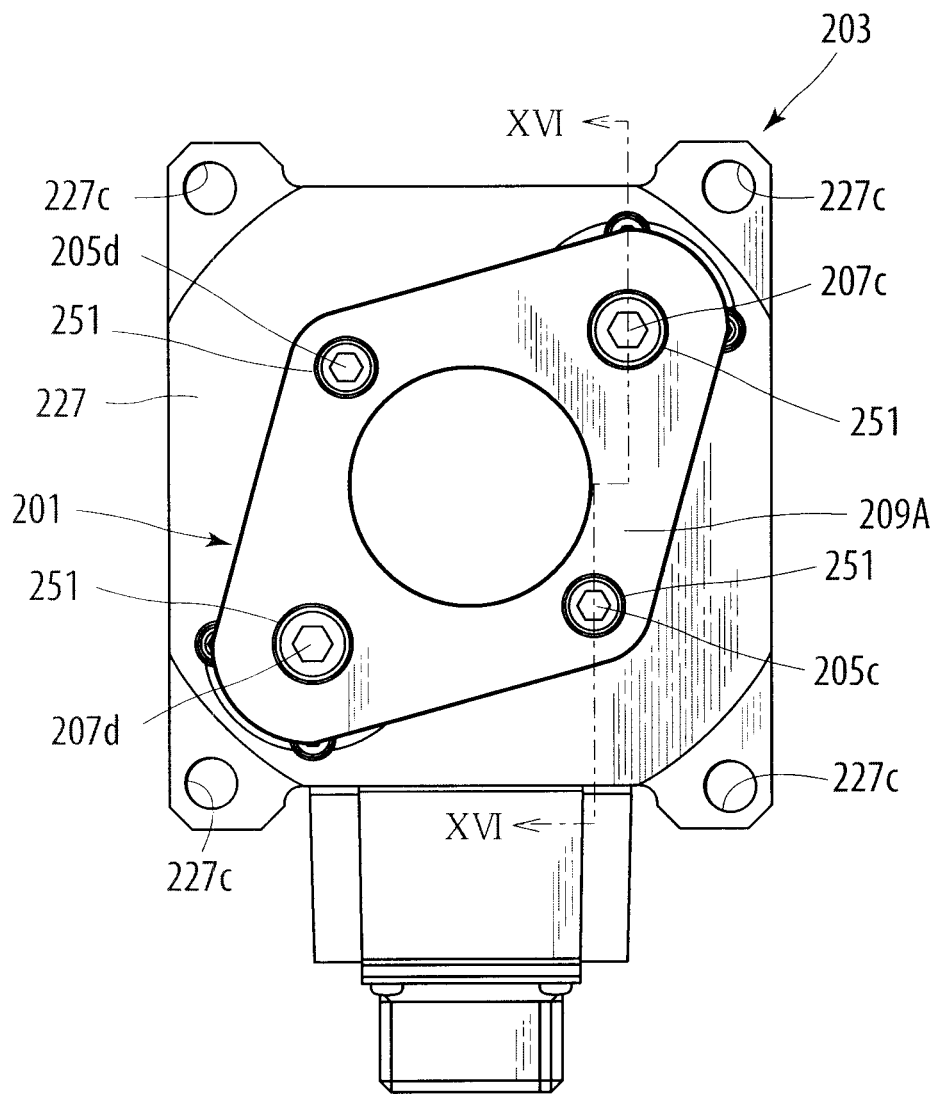
FIG. 14 is a front view of a linear synchronous motor in still another embodiment of the present invention.
Figure 15:
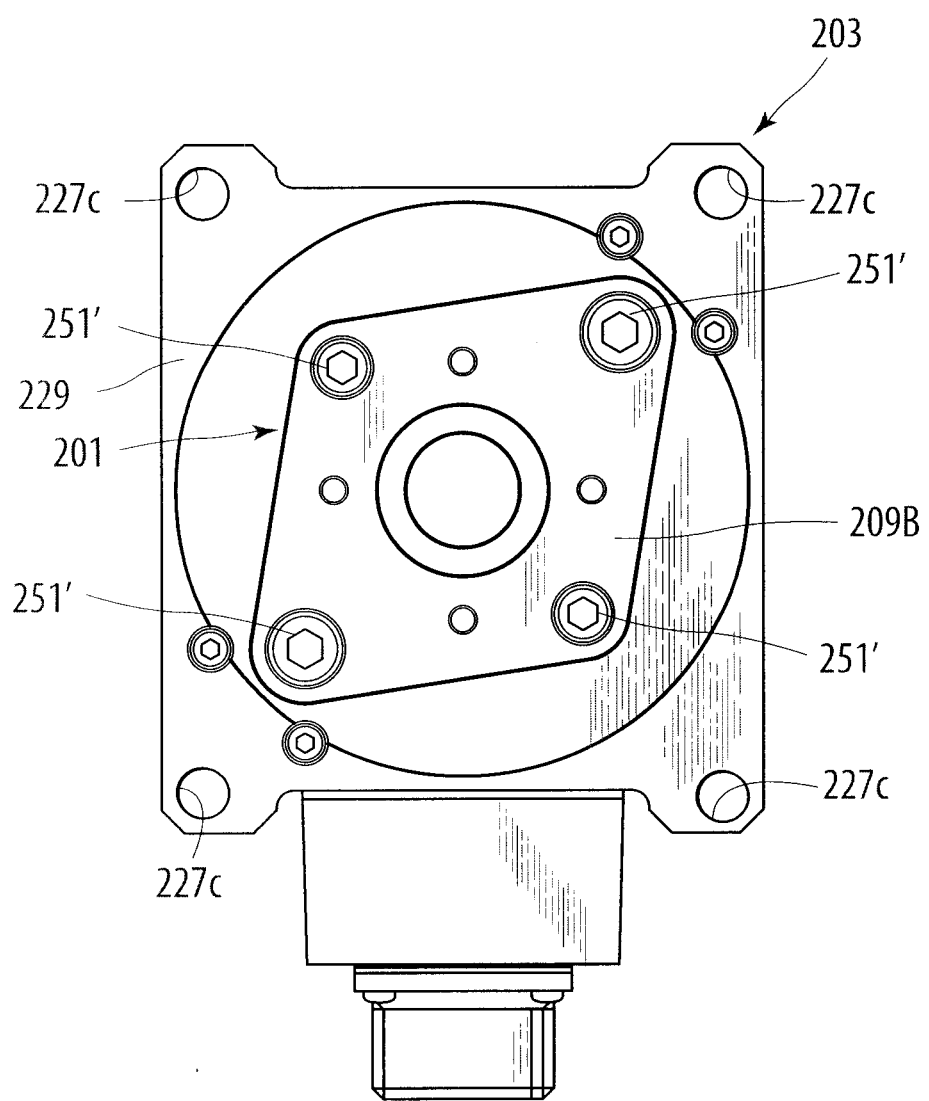
FIG. 15 is a rear view of the linear synchronous motor shown in FIG. 14.

FIGS. 14 and 15 are a front view and a rear view of a linear synchronous motor of the present invention in still another embodiment of the present invention. FIG. 16 is a sectional view taken along line XVI-XVI in FIG. 14. Basically, the linear synchronous motor in this embodiment has the same structure as the linear synchronous motor shown in FIGS. 10 to 13 except for arrays of permanent magnets, a pair of end brackets, and an internal structure of each of the pair of end brackets. For that reason, components of the linear synchronous motor in this embodiment similar to or corresponding to those shown in FIGS. 10 to 13 are given reference numerals obtained by adding 100 to the similar or corresponding components in FIGS. 10 to 13, thereby omitting their description. As shown in FIG. 16, the linear synchronous motor in this embodiment is formed such that each of the end brackets 227, 229 has a large axial length. Inside the end bracket 227, which is one of the pair of end brackets 227, 229, two concave portions 227g, one of which is shown in FIG. 16, opening toward a first connecting member 209A and two concave portions 227h, one of which is shown in FIG. 16, opening toward an end divided core 231 are formed. The two concave portions 227g surround a first guide shaft 207A and a second guide shaft 207B not shown. The two concave portions 227h surround a first direct drive shaft 205A and a second direct drive shaft 205B not shown. Coil springs 249 that constitute a spring mechanism are arranged inside the concave portions 227g. The coil springs 249 fitted into the guide shaft 207A are arranged between the first connecting member 209A and a bottom surface 227i of the concave portion 227g of the end bracket 227. The coil springs 249 generate a biasing force for biasing the first connecting member 209A in a direction apart from a stator core unit 221 when the first connecting member 209A approaches the stator core unit 221. Assume that the linear synchronous motor is disposed such that the first and second direct drive shafts 205A, 205B vertically reciprocate on the page of FIG. 16. Then, by positioning the first connecting member 209A in an upper location relative to a second connecting member 209B on the page of FIG. 16, the first connecting member 209A may be prevented from falling toward the stator core unit 221 by the biasing force of the coil springs 249.

Inside the end bracket 229, which is the other of the pair of end brackets 227, 229, two concave portions 227j, one of which is shown in FIG. 16, opening toward an end divided core 233 are formed. The two concave portions 227j surround the first and second direct drive shafts 205A, 205B. A linear sensor 252 fixed to the end bracket 229 is disposed in each concave portion 227j. A linear scale 253 is mounted on the direct drive shaft 205A to face the linear sensor 252. The linear sensor 252 and the linear scale 253 work together to detect a position of the mover of the linear synchronous motor. In the linear motor in this embodiment, the linear sensor 252 is disposed in each concave portion 227j. Accordingly, the size of the linear motor may be reduced.

In each of the above-mentioned embodiments, the majority of the plurality of divided cores, which are formed of the five intermediate divided cores 35, are formed by laminating a plurality of magnetic steel plates in the axial direct ion. All of the magnetic pole portions may be of course formed by laminating the plurality of magnetic steel plates in the axial direction.

INDUSTRIAL APPLICABILITY

According to the present invention, three closed magnetic circuits are formed between two adjacent divided cores. For that reason, magnetic flux leakage and magnetic saturation may be prevented, thereby allowing a thrust force of the linear synchronous motor to be sufficiently increased.

Further, the first and second guide shafts connected to the first and second direct drive shafts via the first and second connecting members are slidably supported by the pairs of linear bearings. Thus, the support structure for supporting the mover relative to the stator may be simplified. The volume occupied by the linear synchronous motor may be thereby reduced.

Further, there is no need for supporting the first and second direct drive shafts at both ends of the stator core unit. The axial length of the linear synchronous motor may be therefore reduced.

While the preferred embodiments of the invention have been described with a certain degree of particularity with reference to the drawings, obvious modifications and variations are possible in light of the above teachings. It is therefore to be understood that within the scope of the appended claims, the invention may be practiced other than as specifically described.

What is claimed is:

1. A linear synchronous motor comprising:
   a mover including:
      first and second direct drive shafts configured to reciprocate in an axial direction; and
      first and second arrays of permanent magnets respectively mounted on the first and second direct drive shafts, the first array of permanent magnets and the second array of permanent magnets being disposed to be shifted from each other by an electrical angle of 180°; and
   a stator including:
      a first array of windings disposed at predetermined intervals in the axial direction to surround the first direct drive shaft, and a second array of windings disposed at predetermined intervals in the axial direction to surround the second direct drive shaft, the first and second arrays of windings being excited with the first and second arrays of windings being shifted by an electrical angle of 180°; and
   a stator core unit including:
      an array of divided cores each integrally including a first magnetic pole portion disposed to surround the first direct drive shaft concentrically with the first direct drive shaft and a second magnetic pole portion disposed to surround the second direct drive shaft concentrically with the second direct drive shaft, the divided cores being disposed at intervals in the axial direction such that two adjacent divided cores define a space therebetween where one winding of the first array of windings and one winding of the second array of windings are disposed, the divided cores each including at least one pair of connected portions, the at least one pair of connected portions of each divided core being disposed along the first and second direct drive shafts to form at least one pair of connected portion arrays; and
      a yoke to magnetically connect the divided cores, the yoke including at least one pair of yoke elements formed of a magnetic conductive material, the at least one pair of yoke elements magnetically connecting the connected portions of the at least one pair of connected portion arrays respectively.

2. The linear synchronous motor according to claim 1, wherein
   a majority of or all of the divided cores are formed by laminating a plurality of magnetic steel plates of a predetermined shape in the axial direction.

3. The linear synchronous motor according to claim 1, further comprising:
   first and second linear bearings fixed to the stator core unit;
   first and second guide shafts slidably supported by the first and second linear bearings respectively;
   a first connecting member to which ends of the first and second direct drive shafts and ends of the first and second guide shafts are connected; and
   a second connecting member to which the other ends of the first and second direct drive shafts and the other ends of the first and second guide shafts are connected.

4. The linear synchronous motor according to claim 3, wherein
   the at least one pair of yoke elements are formed of a pair of magnetic cylindrical members; and
   the first and second linear bearings are disposed inside the pair of magnetic cylindrical members respectively.

5. The linear synchronous motor according to claim 3, wherein
   the first and second direct drive shafts and the first and second guide shafts are disposed such that axial lines of the first and second direct drive shafts and axial lines of the first and second guide shafts all lie on the same virtual plane.

6. The linear synchronous motor according to claim 3, wherein
   the first and second direct drive shafts and the first and second guide shafts are disposed such that a virtual plane including an axial line of the first direct drive shaft and an axial line of the second direct drive shaft crosses a virtual plane including an axial line of the first guide shaft and an axial line of the second guide shaft in a region surrounded by the first and second direct drive shafts and the first and second guide shafts.

7. The linear synchronous motor according to claim 3, wherein
   a spring mechanism is provided between one of the first and second connecting members and the stator core unit, the spring mechanism configured to generate a biasing force for biasing the one of the first and second connecting members in a direction apart from the stator core unit when the one of the first and second connecting members approaches the stator core unit.

8. The linear synchronous motor according to claim 3, wherein
   the stator core unit includes an end bracket disposed at at least one end of the array of divided cores in the axial direction;

the end bracket includes a concave portion formed therein, the concave portion surrounding one of the first and second direct drive shafts and opening toward the array of divided cores;

a linear sensor fixed to the end bracket is disposed in the concave portion;

a linear scale is mounted on the one of the first and second direct drive shafts to face the linear sensor; and the linear sensor and the linear scale work together to detect a position of the mover.

* * * * *